United States Patent Office 2,725,294
Patented Nov. 29, 1955

2,725,294

HARDENING OF GELATIN WITH POLYANHYDRIDES

Charles F. H. Allen and Burt H. Carroll, Rochester, N. Y., assignors to Eastman Kodak Company, Rochester, N. Y., a corporation of New Jersey No Drawing. Application July 17, 1952, Serial No. 299,499

7 Claims. (Cl. 95—7)

This invention relates to the hardening of gelatin to enhance its resistance to water by incorporating compounds containing a plurality of acid anhydride groups therein.

In the use of gelatin, particularly for photographic purposes, the gelatin is often treated with a succession of solutions which vary in pH or in which elevated temperatures are employed. There has been a great deal of work done on the treatment of gelatin to make it more resistant to water so that swelling and melting of the gelatin does not occur when treated with aqueous solutions in processing operations or in hot drying. The compounds which have been found useful for the treatment of gelatin so as to prevent swelling and melting thereof under processing conditions fall under 4, or possibly 3, classes as follows: 1) metallic salts, such as those of chromium, aluminum, and zirconium; 2) aldehydes, such as formaldehyde and mucochloric acid; 3) 1,2- and 1,4-diketones; 4) quinones, which possibly might be considered as diketones. These hardeners, however, have in many instances exhibited detrimental effects, photographically, of one kind or another. For instance, hardeners of the aldehyde type have a tendency to cause an increase in fogging of the emulsion when employed for hardening therein. Other types of hardeners have a tendency to cause loss in speed of the emulsion upon storage of the same. It is desirable that hardeners for gelatin, when used in photographic emulsions, will not adversely affect the photographic characteristics of the emulsion.

One object of our invention is to provide hardeners for gelatin which exhibit no known detrimental photographic effects. Another object of our invention is to provide materials which, when mixed with gelatin, will render the same resistant to the effects of water at elevated temperatures. A further object of our invention is to provide for the hardening of gelatin by the use of compounds containing 2 or more acid anhydride groups therein. Other objects of our invention will appear herein.

We have found that gelatin is rendered resistant to the effects of water, even at elevated temperatures, by incorporating therein compounds having more than one acid anhydride group therein. Apparently these compounds act to harden the gelatin by uniting polypeptide chains in the gelatin, thus forming material having better resistance to water of elevated temperature than gelatin itself.

Our invention is conveniently carried out by mixing the gelatin with a compound containing 2 or more acid anhydride groups. The preparation of compounds of this type is described by Allen and Spanagel in "Journal of the American Chemical Society," volume 55, page 3773. As these compounds react with water and alcohols, it is desirable in their use that they first be dissolved in anhydrous solvents and slowly added to the gelatin while the pH of the aqueous gelatin solution is maintained at a pH within the range of 7.5–9. The solvents which have been found to be particularly useful for this purpose are the water-soluble ethers or ketones, such, for example, as acetone or dioxane. The solvent used should preferably have no contaminant therein, particularly one which might have a detrimental effect on the photographic emulsion. For instance, it is desirable to purify the dioxane before use to remove peroxides or peroxide-formers therefrom. After the anhydride material has all been added and the pH of the mass remains constant, it is then desirable to add acid to the mass so as to lower the pH below 7, such as to a range of 6–6.5. In the case where the gelatin is being employed in a photographic emulsion, the acid employed may be any acid which can be tolerated by a photosensitive mass, such as dilute aqueous sulfuric acid, acetic acid, citric acid or the like.

In hardening gelatin in accordance with our invention, the polyanhydride need only be employed in a very small amount. For instance, we have found that quantities on the order of 0.3–0.4%, based on the weight of the gelatin, have been quite satisfactory and have given hardening which makes the gelatin resistant to any temperatures as customarily employed in photographic processing operations. It is preferred to employ proportions of the polyanhydride within the range of 0.3–3%, based on the weight of the gelatin; however, the proportion of material employed is not critical, as even less quantities exhibit a hardening effect and the use of greater quantities of the polyanhydride than those specified will contribute to the hardening of the gelatin without any detrimental effect, either on the gelatin or on the photographic emulsion in which the gelatin is employed. Although any compound having a plurality of acid anhydride groups therein may be employed for hardening gelatin in accordance with our invention, the compounds ordinarily employed will be the dianhydrides, as these are the polyanhydrides which are most readily available. The following examples illustrate our invention.

Example 1

50 cc. of a photographic emulsion containing 70 grams of gelatin and 48 grams of silver halide per liter were mixed with 0.025 gram of 7,8-diphenylbicyclo(2,2,2)-7-octene-2,3,5,6-tetracarboxylic dianhydride in 5 cc. of anhydrous acetone. The formula for this hardener is as follows:

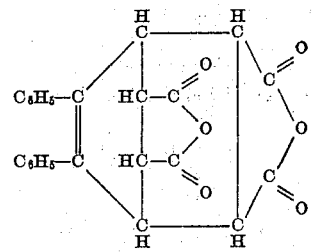

The pH of the emulsion was at 8.5 and was maintained at that value during the addition of the anhydride by also adding aqueous sodium hydroxide during the course of the addition. The mass was also vigorously stirred while adding the anhydride, and until a constant pH was exhibited. The mass was adjusted to a pH of 6.3 and was then coated out onto a support of photographic film base. The melting point of the dried coating in water was found to be 150° F.

Example 2

To 50 cc. of a photographic emulsion, as described in the preceding example, was slowly added 0.10 gram of 7,8 - diphenylbicyclo(2,2,2) - 7 - octene - 1,4 - dimethyl- 2,3,5,6-tetracarboxylic acid anhydride in 5 cc. of anhydrous acetone. This hardener had the following formula:

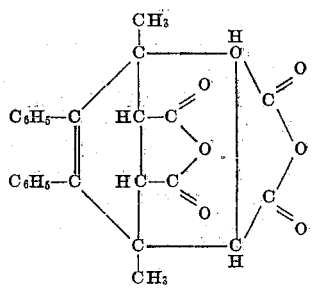

The pH of the emulsion, which was 8.5, was maintained during the addition of the anhydride thereto, together with vigorous stirring of the emulsion. After a constant pH had been attained, the emulsion was acidified to bring the pH down to 6–6.5, and the emulsion was coated out onto a photographic film base. Upon immersion in water it was found that melting of the gelatin emulsion layer did not occur until 150° F. was reached.

Example 3

Example 1 was repeated, except that the emulsion was adjusted to a pH of 7.5 and maintained there during the addition of the hardening agent to the emulsion. The melting point of the coating obtained in water at an elevated temperature was 95° F. initially, and at the end of one hour had risen to 140° F.

Example 4

To 50 cc. of an emulsion as employed in Example 1, having a pH of 8.5, was slowly added 0.05 gram of

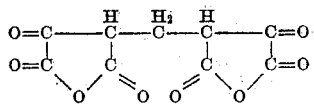

in solution in 5 cc. of anhydrous acetone. During this addition the emulsion was vigorously stirred and the pH was maintained at approximately 8.5 by the simultaneous addition of alkali. After the hardener had all been added, the stirring was continued until the pH became constant. The pH of the mass was then adjusted to 6.3 and the emulsion was coated out onto a film base. The melting point of the dry coating, when immersed in water, was 160° F. When the coating was kept 3 days and then tested by immersing in water at an elevated temperature, it was found that it would resist melting up to a temperature greater than 212° F.

Example 5

Using the same emulsion and conditions as in Example 1, 0.025 gram of

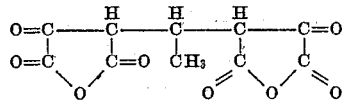

was added to 50 cc. of emulsion. After adjusting the pH to 6–6.5, the emulsion was coated out onto film base. Upon testing by immersing in water having an elevated temperature, it was found that the melting point of this gelatin layer was greater than 100° C.

Example 6

The compound, 3-methoxy-7-methyl-1,4,4a,5,6,7-hexahydro-1,4-ethano-naphthalene-5,6,9,10-tetracarboxylic acid dianhydride (Journal Organic Chemistry 13, 641, 1948), was mixed with gelatin emulsion in the manner described in the preceding examples, and, upon testing, was found to be an effective hardener therefor.

The emulsions in accordance with our invention may be coated out upon any type of support to form photographic products, such as cellulose ester film base, paper, fabric, glass, etc. The emulsions in accordance with our invention will cling to the support therefor up until a temperature is reached (when the emulsion is immersed in water) that the emulsion itself melts and thereby separates from the emulsion support. The emulsion in accordance with our invention may be sensitized or otherwise treated in its manufacture as is conventional for gelatin-silver halide photographic emulsions.

We claim:

1. A composition of matter adapted to form hardened layers which comprises the product which results from the addition to an aqueous solution of a gelatin, at a pH of 7.5–9, of a small proportion of 7,8-diphenylbicyclo (2,2,2)-7-octene-2,3,5,6-tetracarboxylic dianhydride.

2. A composition of matter adapted to form hardened layers which comprises the product which results from the addition to an aqueous solution of gelatin, at a pH of 7.5–9, of a small proportion of 7,8-diphenylbicyclo (2,2,2)-7-octene-1,4-dimethyl 2,3,5,6-tetracarboxylic dianhydride.

3. A gelatino silver halide photographic emulsion adapted to form hardened layers which comprises the product which results from the addition to a gelatino silver halide photographic emulsion, at a pH of 7.5–9, of a small proportion of 7,8-diphenylbicyclo (2,2,2)-7-octene-2,3,5,6-tetracarboxylic dianhydride.

4. A gelatino silver halide photographic emulsion adapted to form hardened layers which comprises the product which results from the addition of a gelatino silver halide emulsion to an emulsion, at a pH of 7.5–9, of a small proportion of 7,8-diphenylbicyclo (2,2,2)-7-octene-1,4-dimethyl-2,3,5,6-tetracarboxylic dianhydride.

5. A composition of matter adapted to form hardened layers which comprises the product which results from the addition to an aqueous solution of gelatin at a pH of 7.5–9 of a small proportion of an organic acid dianhydride.

6. A gelatino silver halide photographic emulsion adapted to form hardened layers which comprises the emulsion which results from the addition to a gelatino silver halide photographic emulsion at a pH of 7.5–9 of an organic acid dianhydride.

7. A composition of matter adapted to form hardened layers which comprises the product which results from the addition to an aqueous solution of gelatin at a pH of 7.5–9 of 0.3–3% based on the weight of the gelatin of an organic acid dianhydride.

References Cited in the file of this patent

UNITED STATES PATENTS

| | | |
|---|---|---|
| 2,384,592 | Bean | Sept. 11, 1945 |
| 2,525,753 | Yutzy et al. | Oct. 10, 1950 |
| 2,592,366 | Wiitala et al. | Apr. 8, 1952 |
| 2,606,118 | Rogers | Aug. 5, 1952 |
| 2,614,928 | Yutzy et al. | Oct. 21, 1952 |
| 2,614,929 | Yutzy et al. | Oct. 21, 1952 |

OTHER REFERENCES

Wall: Photographic Emulsions (1929), 54–57 (American Phot. Pub. Co., Boston).